United States Patent
Yamamoto et al.

(10) Patent No.: US 7,291,093 B2
(45) Date of Patent: Nov. 6, 2007

(54) POWER OUTPUT APPARATUS, CONTROL SYSTEM FOR POWER OUTPUT APPARATUS, AND CONTROL METHOD OF POWER OUTPUT APPARATUS

(75) Inventors: Masaya Yamamoto, Kasugai (JP); Kiyoshiro Ueoka, Nisshin (JP); Kensuke Kamichi, Aichi-gun (JP); Yoichi Tajima, Anjo (JP); Kazuomi Okasaka, Anjo (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 185 days.

(21) Appl. No.: 11/293,389

(22) Filed: Dec. 5, 2005

(65) Prior Publication Data
US 2006/0128523 A1    Jun. 15, 2006

(30) Foreign Application Priority Data
Dec. 10, 2004    (JP)    ............................. 2004-358016

(51) Int. Cl.
*B60W 10/04*    (2006.01)
*B60W 10/10*    (2006.01)

(52) U.S. Cl. .................... 477/110; 903/960; 903/941

(58) Field of Classification Search ................ 477/107, 477/110; 903/960, 941; 290/4 R
See application file for complete search history.

(56) References Cited

U.S. PATENT DOCUMENTS

| 4,956,972 | A | * | 9/1990 | Sasajima et al. | ............... | 60/327 |
| 5,135,443 | A | * | 8/1992 | Paton et al. | ................. | 475/81 |
| 6,335,573 | B1 | * | 1/2002 | Eguchi et al. | ............ | 290/40 C |

FOREIGN PATENT DOCUMENTS

| JP | A 2002-225578 | 8/2002 |
| JP | A 2004-150334 | 5/2004 |
| JP | A 2005-333713 | 2/2005 |
| JP | A 2005-207303 | 8/2005 |

* cited by examiner

*Primary Examiner*—Tisha Lewis
(74) *Attorney, Agent, or Firm*—Oliff & Berridge PLC

(57) ABSTRACT

In a motor vehicle having a planetary gear mechanism linked to an engine, a first motor, and a drive shaft and having a second motor attached to the drive shaft via a transmission, in a Lo gear position of the transmission, the control procedure of the invention drives the engine intermittently corresponding to a preset engine power demand Pe* (steps S170 and S230). In a Hi gear position of the transmission, the control procedure keeps the engine in load operation (step S330). When a relatively large driving force is required in the Hi gear position of the transmission, the drive control of the invention enables quicker output of the required driving force to the drive shaft, compared with the output of the driving force from the operation stop state of the engine.

21 Claims, 10 Drawing Sheets

POWER OUTPUT APPARATUS, CONTROL SYSTEM FOR POWER OUTPUT APPARATUS, AND CONTROL METHOD OF POWER OUTPUT APPARATUS

BACKGROUND OF THE INVENTION

1. Field of the Invention

The present invention relates to a power output apparatus, a control system for the power output apparatus, and a control method of the power output apparatus.

2. Description of the Prior Art

One proposed power output apparatus is mounted on a hybrid vehicle, where an engine, a generator, and a drive shaft are respectively linked to three rotational elements of a planetary gear mechanism and a motor is connected to the drive shaft via a transmission (see, for example, Japanese Patent Laid-Open Gazette No. 2002-225578). This proposed power output apparatus selectively changes over the gear position of the transmission between a high gear position and a low gear position, based on the measured vehicle speed and the required driving force to be output to the drive shaft. The output power of the motor is converted at the selected gear position of the transmission and is output to the drive shaft at a desired power level corresponding to the driving conditions of the hybrid vehicle. Even in the case of temporary stop of transmission of the output power of the motor to the drive shaft during a change of the gear position in the transmission, the output power of the engine compensates for the insufficient power output to the drive shaft in the gear change of the transmission.

SUMMARY OF THE INVENTION

The prior art power output apparatus, however, does not specifically consider the power output in the high gear position of the transmission in the operation stop state of the engine. The hybrid vehicle equipped with such a power output apparatus is generally driven with the power of both an engine and a motor, while the electric vehicle is generally driven with only the power of a motor. The motor on the hybrid vehicle thus often has a lower capacity than the motor on the electric vehicle. When a relatively large driving force is required to be output to the drive shaft in the high gear position of the transmission, the output power of the motor may be insufficient to output the required driving force to the drive shaft. In this case, the engine is restarted and cooperates with the motor to output the required driving force to the drive shaft. The restart of the engine takes some time and leads to a poor response to the driver's demand for the required driving force.

The prior art power output apparatus takes into account the changeover of the gear position of the transmission in the operation state of the engine, but does not specifically consider the changeover of the gear position of the transmission in the operation stop state of the engine. In the operation stop state of the engine, an insufficiency of power output to the drive shaft during the gear change of the transmission can not be compensated by the output power of the engine. This may cause a significant shock in the gear change of the transmission.

The power output apparatus of the invention, the control system for the power output apparatus, and the control method of the power output apparatus thus aim to enable quicker output of a required driving force to a drive shaft. The power output apparatus of the invention, the control system for the power output apparatus, and the control method of the power output apparatus also aim to reduce the potential shock in gear change of a transmission.

In order to attain at least part of the above and the other related objects, the power output apparatus of the invention, the control system for the power output apparatus, and the control method of the power output apparatus have the configurations discussed below.

The present invention is directed to a first power output apparatus that outputs power to a drive shaft and includes: an internal combustion engine that outputs power to the drive shaft; a motor that inputs and outputs power; a transmission mechanism that converts the output power of the motor at a selected gear ratio and transmits the converted power to the drive shaft; an accumulator unit that transmits electric power to and from the motor; a required driving force setting module that sets a required driving force to be output to the drive shaft; an operation stop prohibition module that prohibits operation stop of the internal combustion engine when the selected gear ratio in the transmission mechanism is a reduction gear ratio for reduction of a rotation speed of a rotating shaft of the motor and transmission of the converted power with the reduced rotation speed to the drive shaft and is not greater than a preset reference level, which is less than a maximum possible reduction gear ratio of the transmission mechanism; and a driving force control module that, in the case of prohibition of the operation stop of the internal combustion engine by said operation stop prohibition module, controls the internal combustion engine, the motor, and the transmission mechanism to keep the internal combustion engine in load operation and to output a driving force equivalent to the required driving force to the drive shaft, while in the case of no prohibition of the operation stop of the internal combustion engine by said operation stop prohibition module, controlling the internal combustion engine, the motor, and the transmission mechanism to cause intermittent operation of the internal combustion engine and to output the driving force equivalent to the required driving force to the drive shaft.

While the operation stop of the internal combustion engine is not prohibited, the first power output apparatus of the invention controls the internal combustion engine, the motor, and the transmission mechanism to cause intermittent operation of the internal combustion engine and to output a driving force equivalent to the required driving force to the drive shaft. When the selected gear ratio in the transmission mechanism is a reduction gear ratio for reduction of the rotation speed of the rotating shaft of the motor and transmission of the converted power with the reduced rotation speed to the drive shaft and is not greater than the preset reference level, the first power output apparatus prohibits the operation stop of the internal combustion engine and keeps the engine in load operation. The reference level is set to be less than the maximum possible reduction gear ratio of the transmission mechanism. Namely when the selected gear ratio in the transmission mechanism is not greater than the preset reference level, the technique of this invention prohibits the operation stop of the internal combustion engine and ensures output of the driving force equivalent to the required driving force from the internal combustion engine and the motor to the drive shaft. When a relatively large driving force is required to be output to the drive shaft, this arrangement enables quicker output of the required driving force to the drive shaft, compared with the output of the driving force from the operation stop state of the internal combustion engine.

In one preferable embodiment of the first power output apparatus of the invention, when the selected gear ratio in the transmission mechanism is to be changed over from a reduction gear ratio of greater than the preset reference level to another reduction gear ratio of not greater than the preset reference level in an operation state of the internal combustion engine by the driving force control module, the operation stop prohibition module prohibits the operation stop of the internal combustion engine prior to the changeover of the selected gear ratio in the transmission mechanism. When the selected gear ratio in the transmission mechanism is to be changed over from a reduction gear ratio of greater than the preset reference level to another reduction gear ratio of not greater than the preset reference level in an operation stop state of the internal combustion engine, the driving force control module starts the internal combustion engine prior to the changeover of the selected gear ratio in the transmission mechanism. This arrangement effectively reduces the potential shock in the gear change of the transmission mechanism, compared with the gear change of the transmission mechanism in the operation stop state of the internal combustion engine.

In another preferable embodiment, the first power output apparatus includes: an electric power-mechanical power input output mechanism that is connected to an output shaft of the internal combustion engine and to the drive shaft and outputs at least part of the output power of the internal combustion engine to the drive shaft through input and output of electric power and mechanical power. The driving force control module may control the internal combustion engine, the electric power-mechanical power input output mechanism, the motor, and the transmission mechanism to output the driving force equivalent to the required driving force to the drive shaft. In this embodiment, the electric power-mechanical power input output mechanism includes a three shaft-type power input output module that is linked to three shafts, the output shaft of the internal combustion engine, the drive shaft, and the rotating shaft, and automatically inputs and outputs power from and to a residual one shaft based on powers input from and output to any two shafts among the three shafts; and a generator that is capable of inputting and outputting power from and to the rotating shaft. Further, the electric power-mechanical power input output mechanism includes: a pair-rotor motor that has a first rotor connected to the output shaft of the internal combustion engine and a second rotor connected to the drive shaft, where the first rotator rotates relative to the second rotor.

The present invention is also directed to a second power output apparatus that outputs power to a drive shaft and includes: an internal combustion engine that outputs power to the drive shaft; a motor that inputs and outputs power; a transmission mechanism that converts the output power of the motor at a selected gear ratio and transmits the converted power to the drive shaft; an accumulator unit that transmits electric power to and from the motor; a required driving force setting module that sets a required driving force to be output to the drive shaft; and a control module that controls the internal combustion engine, the motor, and the transmission mechanism to cause intermittent operation of the internal combustion engine and to output a driving force equivalent to the required driving force to the drive shaft, when the selected gear ratio in the transmission mechanism is a reduction gear ratio for reduction of a rotation speed of a rotating shaft of the motor and transmission of the converted power with the reduced rotation speed to the drive shaft and is greater than a preset reference level, which is less than a maximum possible reduction gear ratio of the transmission mechanism, while when the selected gear ratio in the transmission mechanism is not greater than the preset reference level, controlling the internal combustion engine, the motor, and the transmission mechanism to keep the internal combustion engine in load operation and to output the driving force equivalent to the required driving force to the drive shaft.

When the selected gear ratio in the transmission mechanism is a reduction gear ratio for reduction of the rotation speed of the rotating shaft of the motor and transmission of the converted power with the reduced rotation speed to the drive shaft and is greater than the preset reference level, the second power output apparatus controls the internal combustion engine, the motor, and the transmission mechanism to cause intermittent operation of the internal combustion engine and to output a driving force equivalent to the required driving force to the drive shaft. The reference level is set to be less than the maximum possible reduction gear ratio of the transmission mechanism. When the selected gear ratio in the transmission mechanism is not greater than the preset reference level, the second power output apparatus controls the internal combustion engine, the motor, and the transmission mechanism to keep the internal combustion engine in load operation and to output the driving force equivalent to the required driving force to the drive shaft. Namely when the selected gear ratio in the transmission mechanism is not greater than the preset reference level, the technique of this invention keeps the internal combustion engine in load operation and ensures output of the driving force equivalent to the required driving force from the internal combustion engine and the motor to the drive shaft. When a relatively large driving force is required to be output to the drive shaft, this arrangement enables quicker output of the required driving force to the drive shaft, compared with the output of the driving force from the operation stop state of the internal combustion engine.

In one preferable embodiment of the second power output apparatus of the invention, when the selected gear ratio in the transmission mechanism is to be changed over from a reduction gear ratio of greater than the preset reference level to another reduction gear ratio of not greater than the preset reference level in an operation state of the internal combustion engine, the control module controls the internal combustion engine, the motor, and the transmission mechanism to change over the selected gear ratio in the transmission mechanism while keeping the internal combustion engine in operation. When the selected gear ratio in the transmission mechanism is to be changed over from a reduction gear ratio of greater than the preset reference level to another reduction gear ratio of not greater than the preset reference level in an operation stop state of the internal combustion engine, the control module controls the internal combustion engine, the motor, and the transmission mechanism to start the internal combustion engine prior to the changeover of the selected gear ratio in the transmission mechanism. This arrangement effectively reduces the potential shock in the gear change of the transmission mechanism, compared with the gear change of the transmission mechanism in the operation stop state of the internal combustion engine.

In another preferable embodiment of the invention, the second power output apparatus further includes: an electric power-mechanical power input output mechanism that is connected to an output shaft of the internal combustion engine and to the drive shaft and outputs at least part of the output power of the internal combustion engine to the drive shaft through input and output of electric power and mechanical power, and the control module may control the internal combustion engine, the electric power-mechanical power input output mechanism, the motor, and the transmission mechanism to output the driving force equivalent to the required driving force to the drive shaft. In this embodiment, the electric power-mechanical power input output mechanism includes: a three shaft-type power input output module that is linked to three shafts, the output shaft of the internal combustion engine, the drive shaft, and the rotating shaft, and automatically inputs and outputs power from and to a residual one shaft based on powers input from and output to any two shafts among the three shafts; and a generator that is capable of inputting and outputting power from and to the rotating shaft. Further, the electric power-mechanical power input output mechanism include: a pair-rotor motor that has a first rotor connected to the output shaft of the internal combustion engine and a second rotor connected to the drive shaft, where the first rotator rotates relative to the second rotor.

The present invention is further directed to a control system for a power output apparatus including: an internal combustion engine that outputs power to a drive shaft; a motor that inputs and outputs power; a transmission mechanism that converts the output power of the motor at a selected gear ratio and transmits the converted power to the drive shaft; and an accumulator unit that transmits electric power to and from the motor, and the control system includes: a required driving force setting module that sets a required driving force to be output to the drive shaft; an operation stop prohibition module that prohibits operation stop of the internal combustion engine when the selected gear ratio in the transmission mechanism is a reduction gear ratio for reduction of a rotation speed of a rotating shaft of the motor and transmission of the converted power with the reduced rotation speed to the drive shaft and is not greater than a preset reference level, which is less than a maximum possible reduction gear ratio of the transmission mechanism; and a driving force control module that, in the case of prohibition of the operation stop of the internal combustion engine by the operation stop prohibition module, controls the internal combustion engine, the motor, and the transmission mechanism to keep the internal combustion engine in load operation and to output a driving force equivalent to the required driving force to the drive shaft, while in the case of no prohibition of the operation stop of the internal combustion engine by said operation stop prohibition module, controlling the internal combustion engine, the motor, and the transmission mechanism to cause intermittent operation of the internal combustion engine and to output the driving force equivalent to the required driving force to the drive shaft.

While the operation stop of the internal combustion engine is not prohibited, the first control system of the invention controls the internal combustion engine, the motor, and the transmission mechanism to cause intermittent operation of the internal combustion engine and to output a driving force equivalent to the required driving force to the drive shaft. When the selected gear ratio in the transmission mechanism is a reduction gear ratio for reduction of the rotation speed of the rotating shaft of the motor and transmission of the converted power with the reduced rotation speed to the drive shaft and is not greater than the preset reference level, the first control system prohibits the operation stop of the internal combustion engine and keeps the engine in load operation. The reference level is set to be less than the maximum possible reduction gear ratio of the transmission mechanism. Namely when the selected gear ratio in the transmission mechanism is not greater than the preset reference level, the technique of this invention prohibits the operation stop of the internal combustion engine and ensures output of the driving force equivalent to the required driving force from the internal combustion engine and the motor to the drive shaft. When a relatively large driving force is required to be output to the drive shaft, this arrangement enables quicker output of the required driving force to the drive shaft, compared with the output of the driving force from the operation stop state of the internal combustion engine.

In one preferable embodiment of the first control system of the invention, when the selected gear ratio in the transmission mechanism is to be changed over from a reduction gear ratio of greater than the preset reference level to another reduction gear ratio of not greater than the preset reference level in an operation state of the internal combustion engine by the driving force control module, the operation stop prohibition module prohibits the operation stop of the internal combustion engine prior to the changeover of the selected gear ratio in the transmission mechanism. When the selected gear ratio in the transmission mechanism is to be changed over from a reduction gear ratio of greater than the preset reference level to another reduction gear ratio of not greater than the preset reference level in an operation stop state of the internal combustion engine, the driving force control module starts the internal combustion engine prior to the changeover of the selected gear ratio in the transmission mechanism. This arrangement effectively reduces the potential shock in the gear change of the transmission mechanism, compared with the gear change of the transmission mechanism in the operation stop state of the internal combustion engine.

The present invention is directed to a second control system for a power output apparatus including: an internal combustion engine that outputs power to a drive shaft; a motor that inputs and outputs power; a transmission mechanism that converts the output power of the motor at a selected gear ratio and transmits the converted power to the drive shaft; and an accumulator unit that transmits electric power to and from the motor, and the second control system includes: a required driving force setting module that sets a required driving force to be output to the drive shaft; and a control module that controls the internal combustion engine, the motor, and the transmission mechanism to cause intermittent operation of the internal combustion engine and to output a driving force equivalent to the required driving force to the drive shaft, when the selected gear ratio in the transmission mechanism is a reduction gear ratio for reduction of a rotation speed of a rotating shaft of the motor and transmission of the converted power with the reduced rotation speed to the drive shaft and is greater than a preset reference level, which is less than a maximum possible reduction gear ratio of the transmission mechanism, while when the selected gear ratio in the transmission mechanism is not greater than the preset reference level, controlling the internal combustion engine, the motor, and the transmission mechanism to keep the internal combustion engine in load operation and to output the driving force equivalent to the required driving force to the drive shaft.

When the selected gear ratio in the transmission mechanism is a reduction gear ratio for reduction of the rotation speed of the rotating shaft of the motor and transmission of the converted power with the reduced rotation speed to the drive shaft and is greater than the preset reference level, the second control system controls the internal combustion engine, the motor, and the transmission mechanism to cause intermittent operation of the internal combustion engine and to output a driving force equivalent to the required driving force to the drive shaft. The reference level is set to be less than the maximum possible reduction gear ratio of the transmission mechanism. When the selected gear ratio in the transmission mechanism is not greater than the preset reference level, the second control system controls the internal combustion engine, the motor, and the transmission mechanism to keep the internal combustion engine in load operation and to output the driving force equivalent to the required driving force to the drive shaft. Namely when the selected gear ratio in the transmission mechanism is not greater than the preset reference level, the technique of this invention keeps the internal combustion engine in load operation and ensures output of the driving force equivalent to the required driving force from the internal combustion engine and the motor to the drive shaft. When a relatively large driving force is required to be output to the drive shaft, this arrangement enables quicker output of the required driving force to the drive shaft, compared with the output of the driving force from the operation stop state of the internal combustion engine.

In one preferable embodiment of the second control system of the invention, when the selected gear ratio in the transmission mechanism is to be changed over from a reduction gear ratio of greater than the preset reference level to another reduction gear ratio of not greater than the preset reference level in an operation state of the internal combustion engine, the control module controls the internal combustion engine, the motor, and the transmission mechanism to change over the selected gear ratio in the transmission mechanism while keeping the internal combustion engine in operation. When the selected gear ratio in the transmission mechanism is to be changed over from a reduction gear ratio of greater than the preset reference level to another reduction gear ratio of not greater than the preset reference level in an operation stop state of the internal combustion engine, the control module controls the internal combustion engine, the motor, and the transmission mechanism to start the internal combustion engine prior to the changeover of the selected gear ratio in the transmission mechanism. This arrangement effectively reduces the potential shock in the gear change of the transmission mechanism, compared with the gear change of the transmission mechanism in the operation stop state of the internal combustion engine.

The present invention is directed to a control method of a power output apparatus including: an internal combustion engine that outputs power to a drive shaft; a motor that inputs and outputs power; a transmission mechanism that converts the output power of the motor at a selected gear ratio and transmits the converted power to the drive shaft; and an accumulator unit that transmits electric power to and from the motor, and the control method controls the internal combustion engine, the motor, and the transmission mechanism to cause intermittent operation of the internal combustion engine and to output to the drive shaft a driving force equivalent to a required driving force, which is to be output to the drive shaft, when the selected gear ratio in the transmission mechanism is a reduction gear ratio for reduction of a rotation speed of a rotating shaft of the motor and transmission of the converted power with the reduced rotation speed to the drive shaft and is greater than a preset reference level, which is less than a maximum possible reduction gear ratio of the transmission mechanism, while when the selected gear ratio in the transmission mechanism is not greater than the preset reference level, controlling the internal combustion engine, the motor, and the transmission mechanism to keep the internal combustion engine in load operation and to output the driving force equivalent to the required driving force to the drive shaft.

When the selected gear ratio in the transmission mechanism is a reduction gear ratio for reduction of the rotation speed of the rotating shaft of the motor and transmission of the converted power with the reduced rotation speed to the drive shaft and is greater than the preset reference level, the control method of the invention controls the internal combustion engine, the motor, and the transmission mechanism to cause intermittent operation of the internal combustion engine and to output a driving force equivalent to the required driving force to the drive shaft. The reference level is set to be less than the maximum possible reduction gear ratio of the transmission mechanism. When the selected gear ratio in the transmission mechanism is not greater than the preset reference level, the control method of the invention controls the internal combustion engine, the motor, and the transmission mechanism to keep the internal combustion engine in load operation and to output the driving force equivalent to the required driving force to the drive shaft. Namely when the selected gear ratio in the transmission mechanism is not greater than the preset reference level, the technique of this invention keeps the internal combustion engine in load operation and ensures output of the driving force equivalent to the required driving force from the internal combustion engine and the motor to the drive shaft. When a relatively large driving force is required to be output to the drive shaft, this arrangement enables quicker output of the required driving force to the drive shaft, compared with the output of the driving force from the operation stop state of the internal combustion engine.

In one preferable embodiment, when the selected gear ratio in the transmission mechanism is to be changed over from a reduction gear ratio of greater than the preset reference level to another reduction gear ratio of not greater than the preset reference level in an operation state of the internal combustion engine, the control method of the invention controls the internal combustion engine, the motor, and the transmission mechanism to change over the selected gear ratio in the transmission mechanism while keeping the internal combustion engine in operation. Further, when the selected gear ratio in the transmission mechanism is to be changed over from a reduction gear ratio of greater than the preset reference level to another reduction gear ratio of not greater than the preset reference level in an operation stop state of the internal combustion engine, the control method of the invention controls the internal combustion engine, the motor, and the transmission mechanism to start the internal combustion engine prior to the changeover of the selected gear ratio in the transmission mechanism. This arrangement effectively reduces the potential shock in the gear change of the transmission mechanism, compared with the gear change of the transmission mechanism in the operation stop state of the internal combustion engine.

DESCRIPTION OF THE PREFERRED EMBODIMENTS

Figure 1:
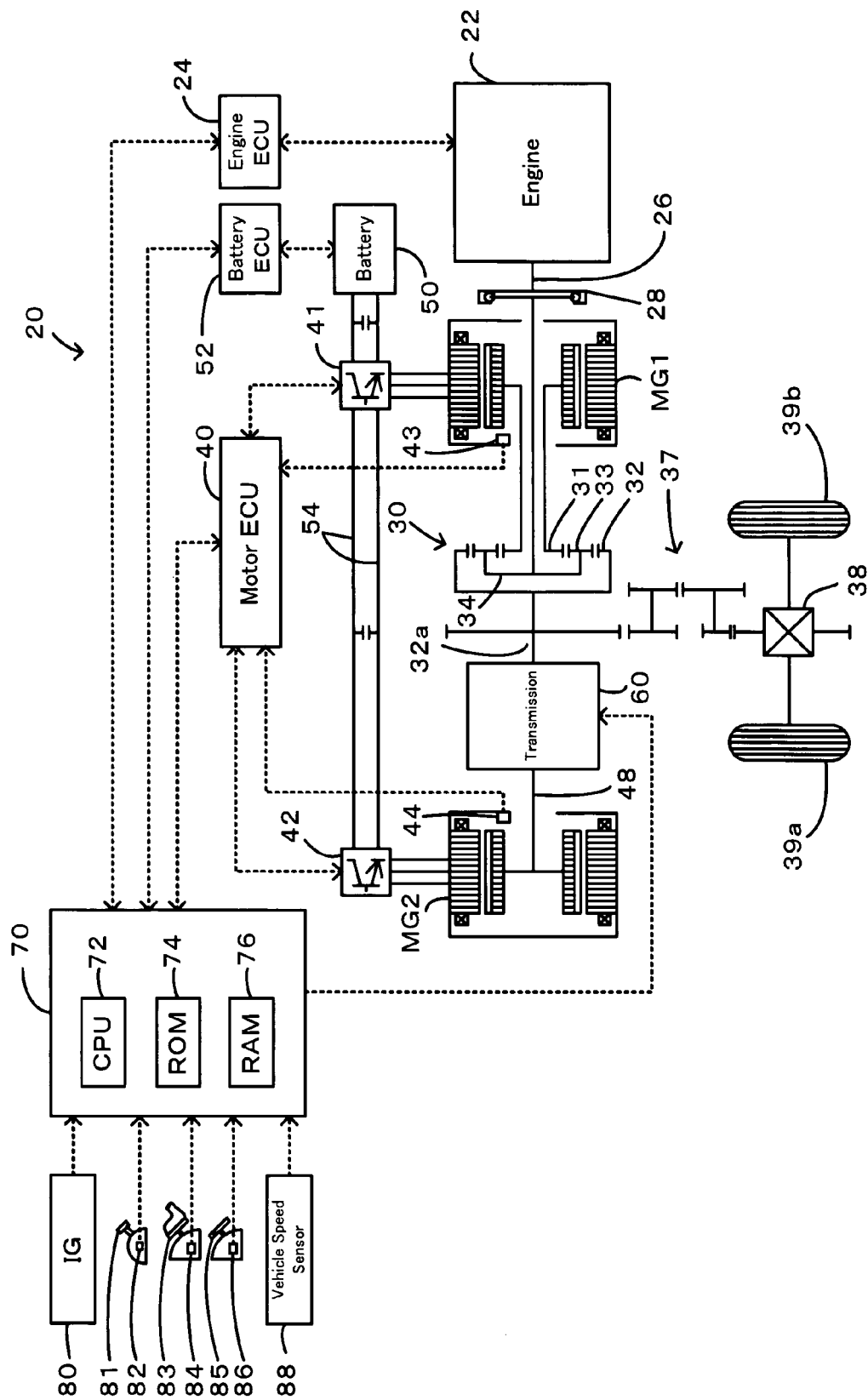
FIG. 1 schematically illustrates the configuration of a hybrid vehicle equipped with a power output apparatus in one embodiment of the invention.

One mode of carrying out the invention is discussed below as a preferred embodiment. FIG. 1 schematically illustrates the configuration of a hybrid vehicle 20 equipped with a power output apparatus in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is linked to the power distribution integration mechanism 30 and has power generation capability, a motor MG2 that is linked to the power distribution integration mechanism 30 via a transmission 60, and a hybrid electronic control unit 70 that controls the whole operations of the hybrid vehicle 20.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements.

The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 39a and 39b via the gear mechanism 37, and the differential gear 38 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 executes a rotation speed computation routine (not shown) to calculate rotation speeds Nm1 and Nm2 of the respective rotors in the motors MG1 and MG2 from the input signals of the rotational position detection sensors 43 and 44. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

Figure 2:
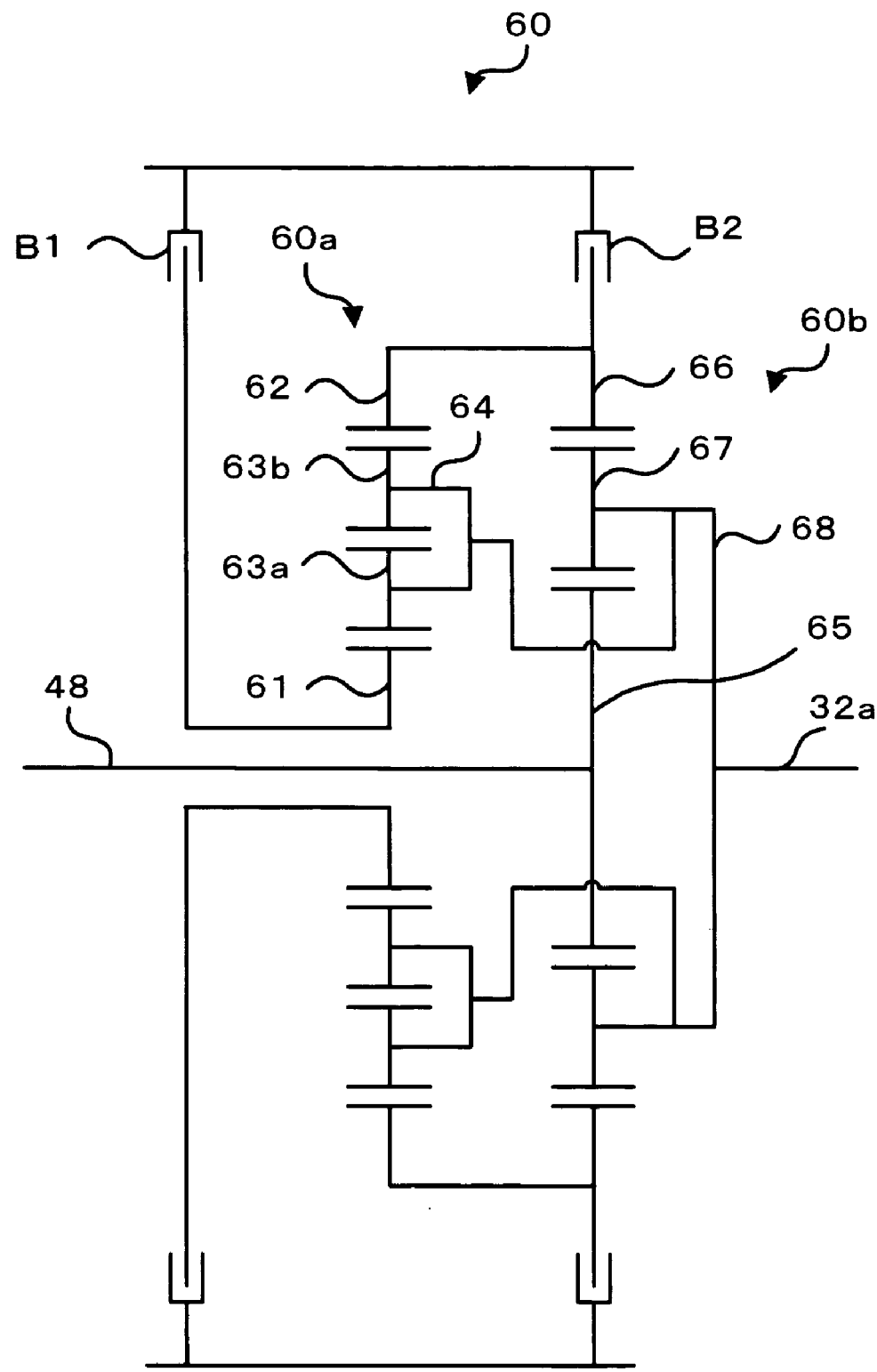
FIG. 2 shows one typical structure of a transmission included in the hybrid vehicle of the embodiment.

The transmission 60 is designed to connect and disconnect a rotating shaft 48 of the motor MG2 with and from the ring gear shaft 32a. In the connection state, the transmission 60 reduces the rotation speed of the rotating shaft 48 of the motor MG2 at two different reduction gear ratios and transmits the reduced rotation speed to the ring gear shaft 32a. One typical structure of the transmission 60 is shown in FIG. 2. The transmission 60 shown in FIG. 2 has a double-pinion planetary gear mechanism 60a, a single-pinion planetary gear mechanism 60b, and two brakes B1 and B2. The double-pinion planetary gear mechanism 60a includes a sun gear 61 as an external gear, a ring gear 62 as an internal gear arranged concentrically with the sun gear 61, multiple first pinion gears 63a engaging with the sun gear 61, multiple second pinion gears 63b engaging with the multiple first pinion gears 63a and with the ring gear 62, and a carrier 64 coupling the multiple first pinion gears 63a to the multiple second pinion gears 63b to allow both their revolutions and their rotations on their axes. The engagement and the release of the brake B1 stop and allow the rotation of the sun gear 61. The single-pinion planetary gear mechanism 60b includes a sun gear 65 as an external gear, a ring gear 66 as an internal gear arranged concentrically with the sun gear 65, multiple pinion gears 67 engaging with the sun gear 65 and with the ring gear 66, and a carrier 68 holding the multiple pinion gears 67 to allow both their revolutions and their rotations on their axes. The sun gear 65 and the carrier 68 are respectively connected to the rotating shaft 48 of the motor MG2 and to the ring gear shaft 32a. The engagement and the release of the brake B2 stop and allow the rotation of the ring gear 66. The double-pinion planetary gear mechanism 60a and the single-pinion planetary gear mechanism 60b are coupled with each other via linkage of the respective ring gears 62 and 66 and linkage of the respective carriers 64 and 68. In the transmission 60, the combination of the released brakes B1 and B2 disconnects the rotating shaft 48 of the motor MG2 from the ring gear shaft 32a. The combination of the released brake B1 and the engaged brake B2 reduces the rotation of the rotating shaft 48 of the motor MG2 at a relatively high reduction gear ratio and transmits the reduced rotation to the ring gear shaft 32a. This state is expressed as Lo gear position. The combination of the engaged brake B1 and the released brake B2 reduces the rotation of the rotating shaft 48 of the motor MG2 at a relatively low reduction gear ratio and transmits the reduced rotation to the ring gear shaft 32a. This state is expressed as Hi gear position. The combination of the engaged brakes B1 and B2 prohibits the rotations of the rotating shaft 48 and the ring gear shaft 32a. In the structure of this embodiment, the brakes B1 and B2 are engaged and released by controlling hydraulic actuators (not shown) to regulate the hydraulic pressure levels applied to the respective brakes B1 and B2.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 outputs, via its output port, driving signals to the hydraulic actuators (not shown) for the brakes B1 and B2 included in the transmission 60. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
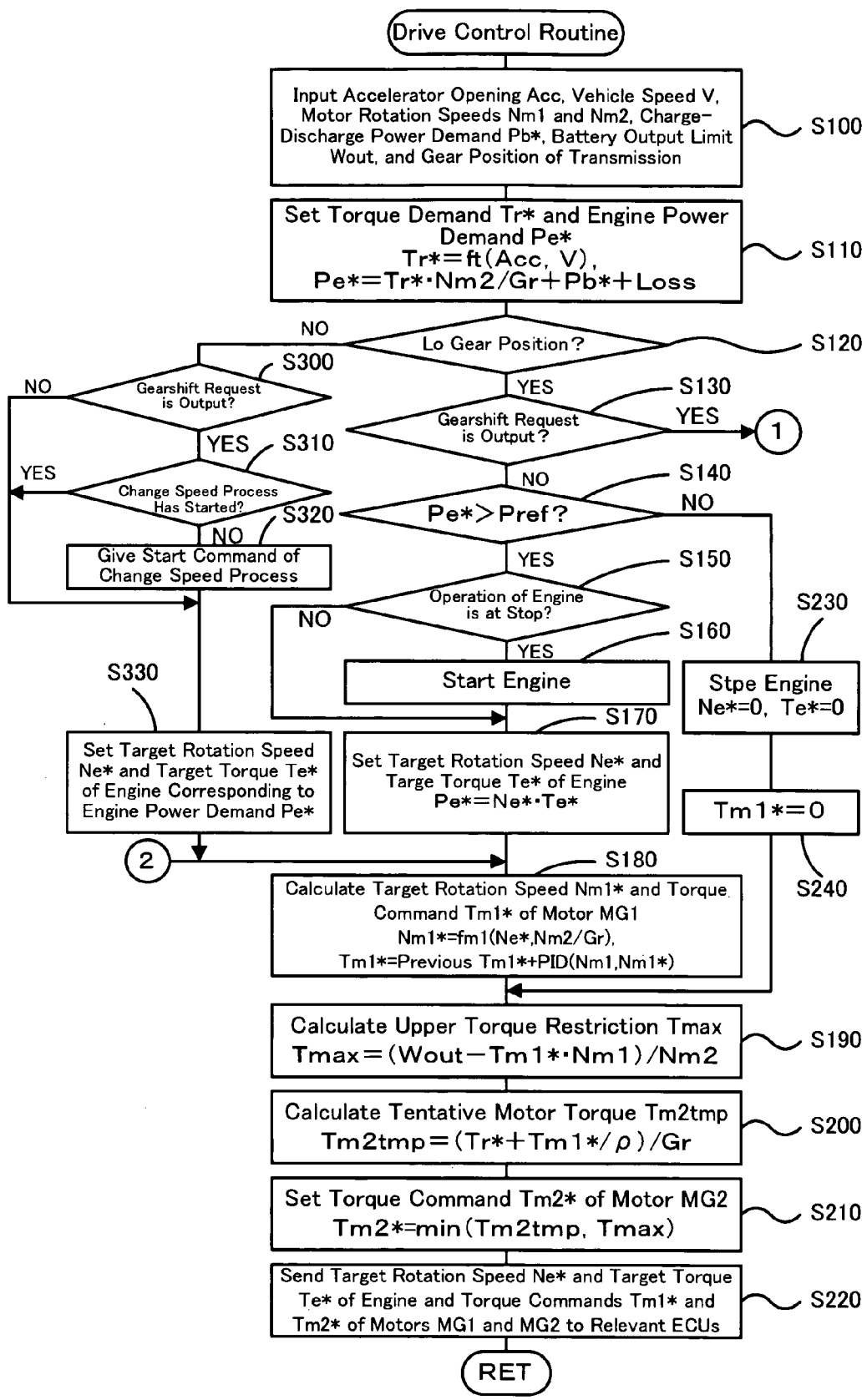
FIG. 3 is a flowchart showing a drive control routine executed by a hybrid electronic control unit included in the hybrid vehicle of the embodiment.
Figure 4:
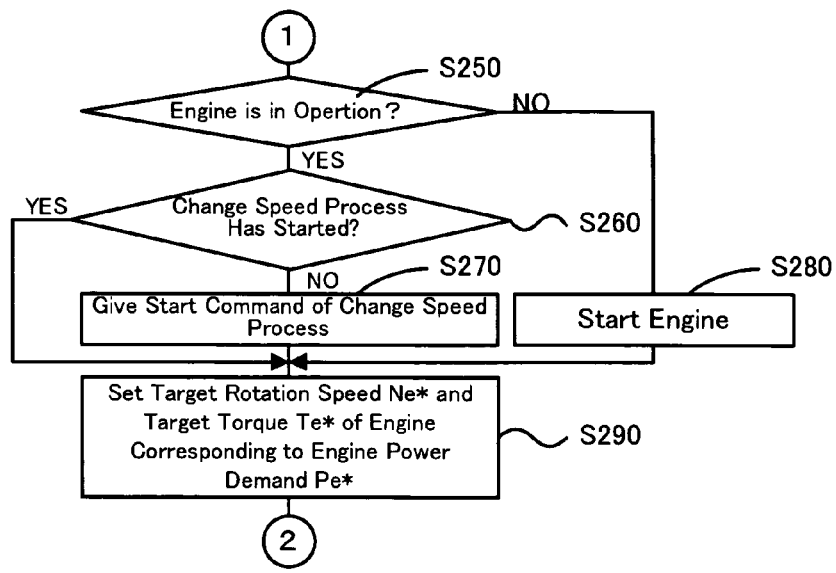
FIG. 4 is a flowchart showing the drive control routine executed by the hybrid electronic control unit included in the hybrid vehicle of the embodiment.

The description regards the operations of the hybrid vehicle 20 of the embodiment constructed as discussed above. FIGS. 3 and 4 are flowcharts showing a drive control routine executed by the hybrid electronic control unit 70 mounted on the hybrid vehicle 20 of the embodiment. This drive control routine is carried out repeatedly at preset time intervals, for example, at every several msec.

In the drive control routine, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, a charge-discharge power demand Pb* to be charged into or discharged from the battery 50, an output limit Wout of the battery 50, and a gear position of the transmission 60 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The charge-discharge power demand Pb* is set according to the current state of charge SOC of the battery 50 and is received from the battery ECU 52 by communication. The output limit Wout of the battery 50 is set based on the measured temperature Tb and the observed state of charge SOC of the battery 50 and is received from the battery ECU 52 by communication. The gear position of the transmission 60 is either the Lo gear position or the Hi gear position, which is specified by a reduction gear ratio Gr of the transmission 60. The reduction ratio Gr of the transmission 60 is calculated by dividing a rotation speed Nm2 of the motor MG2 by a rotation speed Nr of the ring gear shaft 32*a*. The rotation speed Nr of the ring gear shaft 32*a* is obtained by multiplying the vehicle speed V by a preset conversion factor k.

Figure 5:
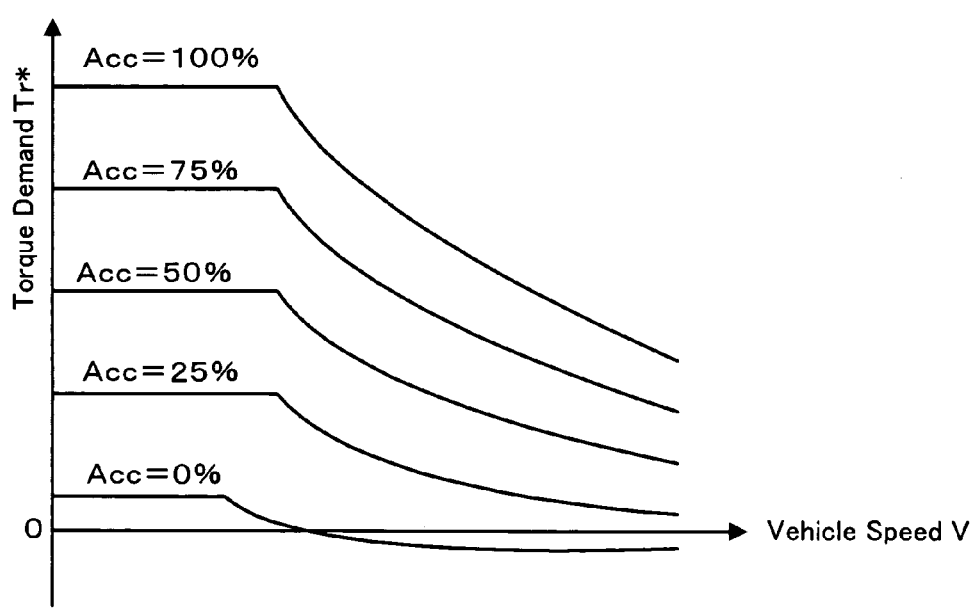
FIG. 5 shows one example of a torque demand setting map.

After the data input, the CPU 72 sets a torque demand Tr* to be output to the ring gear shaft 32*a* or the drive shaft and an engine power demand Pe* required for the engine 22, based on the input accelerator opening Acc and the input vehicle speed V (step S110) A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from this torque demand setting map. One example of the torque demand setting map is shown in FIG. 5. The engine power demand Pe* is calculated as the sum of the product of the torque demand Tr* and the rotation speed Nr of the ring gear shaft 32*a*, the charge-discharge power demand Pb* to be charged into or discharged from the battery 50, and a potential loss.

Figure 6:
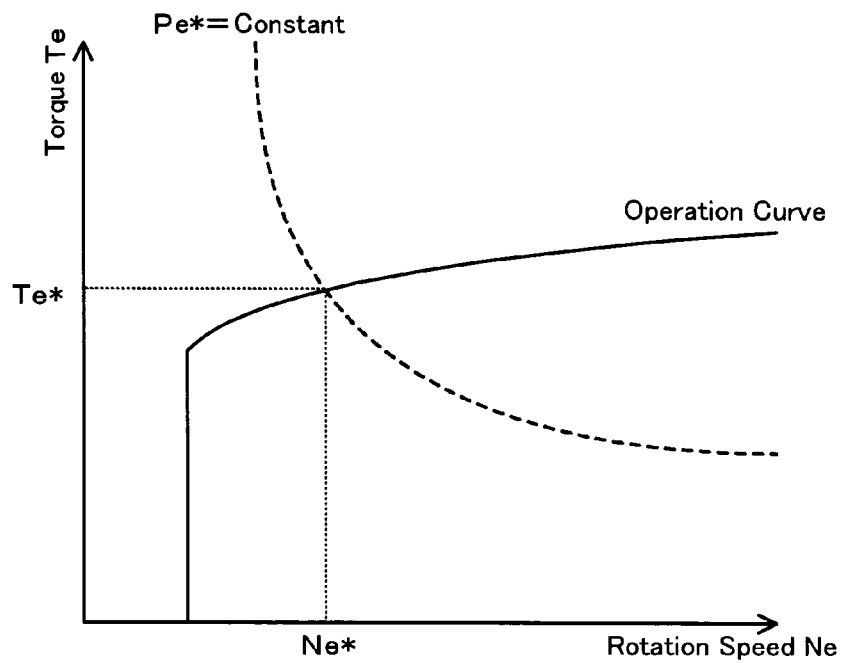
FIG. 6 shows an efficient operation curve of an engine to set a target rotation speed Ne* and a target torque Te*.

The CPU 72 identifies the input gear position of the transmission 60 (step S120) and determines whether a gearshift request of the transmission 60 is output in the Lo gear position of the transmission 60 (step S130). The gearshift request of the transmission 60 is output at a specific timing depending upon the torque demand Tr* and the vehicle speed V. When the identified gear position of the transmission 60 is the Lo gear position (step S120) and no gearshift request of the transmission is output (step S130), the engine power demand Pe* is compared with a preset reference power level Pref (step S140) The reference power level Pref is used as a criterion for determining whether the operation of the engine 22 is to be stopped, and is set to or around a lower limit of efficient power output of the engine 22 in this embodiment. When the engine power demand Pe* is greater than the preset reference power level Pref (step S140) and when the operation of the engine 22 is at stop (step S150), the CPU 72 starts the engine 22 (step S160) and sets a target rotation speed Ne* and a target torque Te* of the engine 22 corresponding to the engine power demand Pe* (step S170). The target rotation speed Ne* and the target torque Te* of the engine 22 are determined according to an efficient operation curve of ensuring efficient operations of the engine 22 and the engine power demand Pe*. FIG. 6 shows an efficient operation curve of the engine 22 to set the target rotation speed Ne* and the target torque Te*. The target rotation speed Ne* and the target torque Te* are given at an intersection of the efficient operation curve and a curve of constant engine power demand Pe* (=Ne*×Te*).

After setting the target rotation speed Ne* and the target torque Te* of the engine 22, the CPU 72 calculates a target rotation speed Nm1* of the motor MG1 from the target rotation speed Ne* of the engine 22, the rotation speed Nr of the ring gear shaft 32*a*, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S180):

$$Nm1^* = Ne^* \cdot (1+\rho)/\rho - Nr/\rho \qquad (1)$$

$$Tm1^* = \text{Previous } Tm1^* + k1(Nm1^* - Nm1) + k2\int(Nm1^* - Nm1)dt \qquad (2)$$

Figure 7:
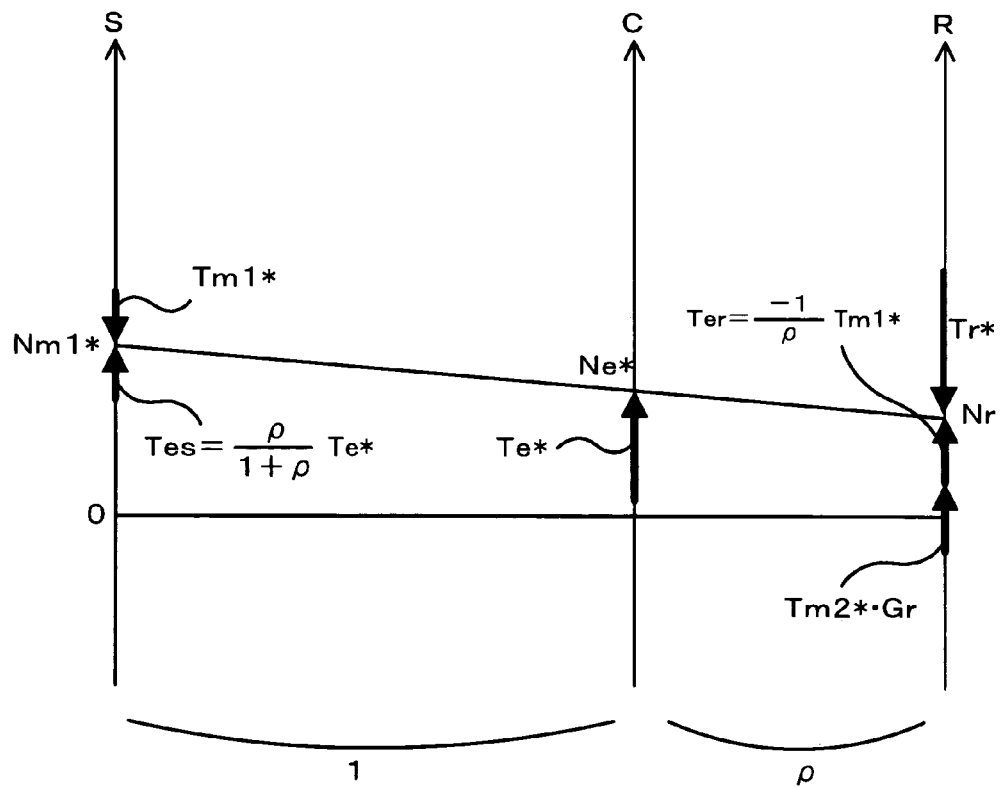
FIG. 7 is an alignment chart showing torque-rotation speed dynamics of respective rotational elements of a power distribution integration mechanism included in the hybrid vehicle of the embodiment.

Equation (1) is a dynamic relational expression of the rotational elements included in the power distribution integration mechanism 30. FIG. 7 is an alignment chart showing torque-rotation speed dynamics of the respective rotational elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 (ring gear shaft 32*a*). The target rotation speed Nm1* of the motor MG1 is readily introduced from the relation of the rotation speed in this alignment chart. The torque command Tm1* is set to enable rotation of the motor MG1 at the target rotation speed Nm1*, and the motor MG1 is driven and controlled to satisfy the combination of the torque command Tm1* and the target rotation speed Nm1*. The engine 22 is accordingly rotated at the target rotation speed Ne*. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term. Two upward thick arrows on the axis 'R' in the alignment chart of FIG. 7 respectively show a direct transmission torque Ter that is directly transmitted to the ring gear shaft 32*a* when the torque Te* is output from the engine 22 driven at a specific drive point of the target rotation speed Ne* and the target torque Te*, and a torque that is applied to the ring gear shaft 32*a* via the transmission 60 when a torque Tm2* is output from the motor MG2.

After calculation of the target rotation speed Nm1* and the torque command Tm1* of the motor MG1, the CPU 72 calculates an upper torque restriction Tmax as a maximum possible torque output from the motor MG2 according to Equation (3) given below (step S190). The calculation subtracts the product of the calculated torque command Tm1* and the current rotation speed Nm1 of the motor MG1, which represents the power consumption (power generation) of the motor MG1, from the output limit Wout of the battery 50 and divides the difference by the current rotation speed Nm2 of the motor MG2:

$$Tmax = (Wout - Tm1^* \cdot Nm1)/Nm2 \qquad (3)$$

A tentative motor torque Tm2tmp is calculated, as a torque to be output from the motor MG2, from the torque demand Tr*, the torque command Tm1* of the motor MG1, the gear ratio ρ of the power distribution integration mechanism 30, and the reduction gear ratio Gr of the transmission 60 according to Equation (4) given below (step S200):

$$Tm2tmp = (Tr^* + Tm1^*/\rho)/Gr \qquad (4)$$

A torque command Tm2* of the motor MG2 is set by limiting the calculated tentative motor torque Tm2*tmp* to the upper torque restriction Tmax (step S210). Such setting of the torque command Tm2* of the motor MG2 restricts the torque demand Tr* to be output to the ring gear shaft 32*a* or the drive shaft in the range of the output limit Wout of the battery 50. Equation (4) is readily led from the alignment chart of FIG. 7.

The CPU 72 sends the target rotation speed Ne* and the target torque Te* of the engine 22 to the engine ECU 24 and the torque commands Tm1* and Tm2* of the motors MG1 and MG2 to the motor ECU 40 (step S220), and then exits from this drive control routine. In the operation state of the engine 22, in response to reception of the target rotation speed Ne* and the target torque Te*, the engine ECU 24 executes fuel injection control and ignition control to drive the engine 22 at the specified drive point of the target rotation speed Ne* and the target torque Te*. In the operation stop state of the engine 22, on the other hand, the engine ECU 24 starts the engine 22 and executes fuel injection control and ignition control to drive the engine 22 at the specified drive point of the target rotation speed Ne* and the target torque Te*. The motor ECU 40 receives the torque commands Tm1* and Tm2* and executes switching control of the switching elements included in the respective inverters 41 and 42 to drive the motor MG1 with the torque command Tm1* and the motor MG2 with the torque command Tm2*.

When the engine power demand Pe* is not greater than the preset reference power level Pref (step S140), on the contrary, the CPU 72 determines the requirement for a stop of the engine 22 and sets the value '0' to both the target rotation speed Ne* and the target torque Te* to stop the engine 22 (step S230). The CPU 72 subsequently sets the value '0' to the torque command Tm1* of the motor MG1 (step S240) and sets the torque command Tm2* of the motor MG2 (steps S190 to S210). The CPU 72 sends the target rotation speed Ne* and the target torque Te* of the engine 22 to the engine ECU 24 and the torque commands Tm1* and Tm2* of the motors MG1 and MG2 to the motor ECU 40 (step S220), and exits from this drive control routine. In the operation state of the engine 22, in response to reception of the target rotation speed Ne* and the target torque Te* set equal to 0, the engine ECU 24 stops the operation of the engine 22. In the operation stop state of the engine 22, on the other hand, the engine ECU 24 keeps the engine 22 at stop. When no gearshift request of the transmission 60 is output in the Lo gear position of the transmission 60, the intermittent operation of the engine 22 according to the engine power demand Pe* effectively enhances the energy efficiency.

In response to output of a gearshift request of the transmission 60 at step S130, that is, in response to output of a command for changing over the gear position of the transmission 60 from the Lo gear position to the Hi gear position, the CPU 72 determines whether the engine 22 is in operation (step S250) in the drive control routine of FIG. 4. In the operation state of the engine 22 at step S250, when a change speed process of changing over the gear position of the transmission 60 has not yet started (step S260), the CPU 72 gives a start command of the change speed process (step S270) and sets the target rotation speed Ne* and the target torque Te* of the engine 22 to drive the engine 22 at an efficient drive point corresponding to the engine power demand Pe* (step S290). The CPU 72 then executes the processing of and after step S180 in the drive control routine of FIG. 3. The change speed process drives and controls a hydraulic actuator (not shown) to change over the gear position of the transmission 60 from the combination of the released brake B1 and the engaged brake B2 to the combination of the engaged brake B1 and the released brake B2. In the non-operation state of the engine 22 at step S250, on the contrary, the CPU 72 starts the engine 22 (step S280) and executes the processing of and after step S290. The start of the engine 22 leads to an affirmative answer at step S250.

Figure 8:
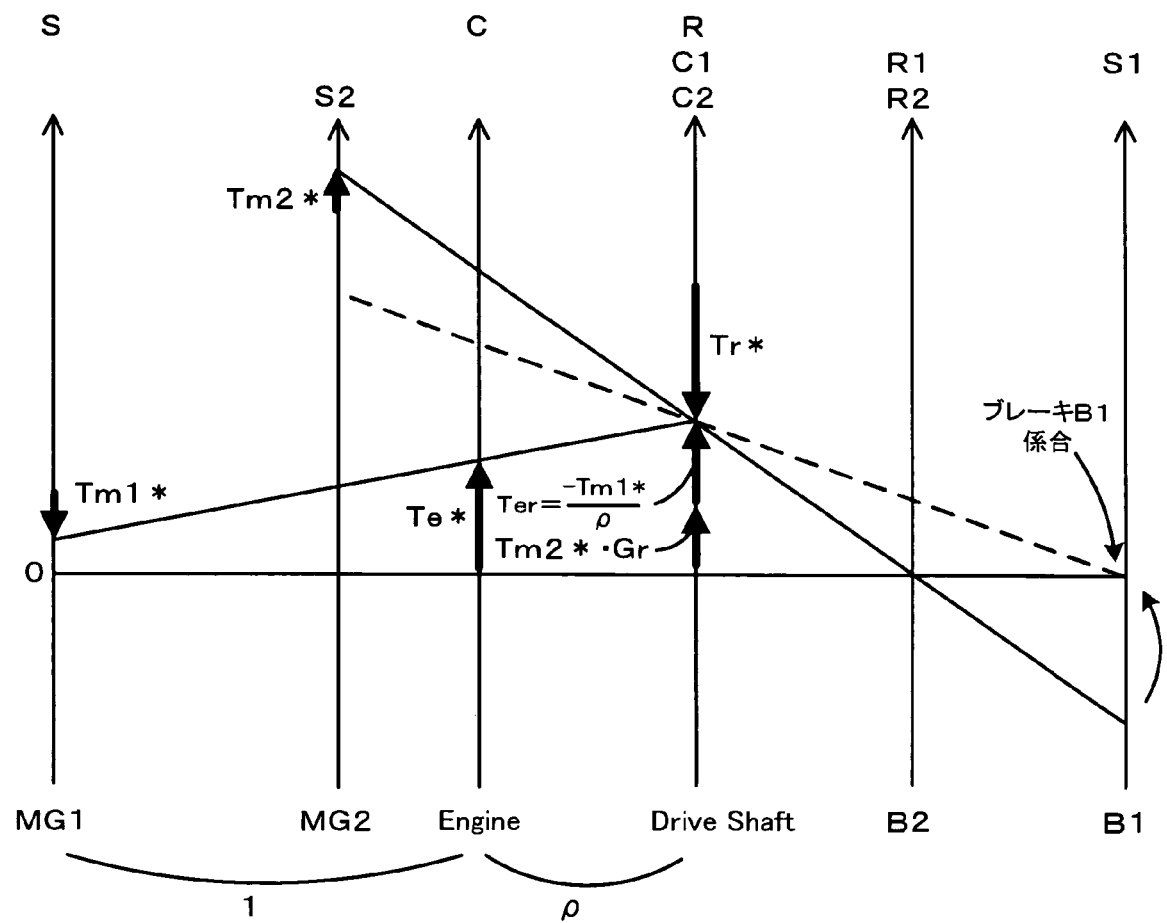
FIG. 8 is an alignment chart showing torque-rotation speed dynamics of the power distribution integration mechanism and the transmission.

When the change speed process of changing over the gear position of the transmission 60 has not yet started (step S260), the CPU 72 gives the start command of the change speed process (step S270) and executes the processing of and after step S290. In response to output of a gearshift request of the transmission 60 in the operation state of the engine 22, the drive control routine executes the change speed process of changing over the gear position of the transmission 60, while keeping the engine 22 in operation. In response to output of a gearshift request of the transmission 60 in the operation stop state of the engine 22, on the other hand, the drive control routine starts the engine 22 and then executes the change speed process of changing over the gear position of the transmission 60. This drive control is ascribed to the following reason. FIG. 8 is an alignment chart showing torque-rotation speed dynamics of the power distribution integration mechanism 30 and the transmission 60. The axis 'S' represents the rotation speed of the sun gear 31 in the power distribution integration mechanism 30 that is equivalent to the rotation speed Nm1 of the motor MG1. The axis 'C' represents the rotation speed of the carrier 34 in the power distribution integration mechanism 30 that is equivalent to the rotation speed Ne of the engine 22. The axis 'R', 'C1', and 'C2' represents the rotation speed of the ring gear 32 (ring gear shaft 32a) in the power distribution integration mechanism 30 and the rotation speeds of the carriers 64 and 68 in the transmission 60. The axis 'S2' represents the rotation speed of the sun gear 65 in the transmission 60 that is equivalent to the rotation speed Nm2 of the motor MG2. The axis 'R1' and 'R2' represents the rotation speeds of the ring gears 62 and 66 in the transmission 60. The axis 'S1' represents the rotation speed of the sun gear 61 in the transmission 60. The change speed process changes over the gear position of the transmission 60 from the Lo gear position (shown by the solid line) to the Hi gear position (shown by the broken line). In this change speed process, the brake B1 is changed from the released position through friction engagement to the engaged position, while the brake B2 is changed from the engaged position to the released position. The greater output torque of the motor MG2 causes the more significant shock on the ring gear shaft 32a or the drive shaft in the gear change of the transmission 60. It is thus desirable to minimize the output torque of the motor MG2. In the operation state of the engine 22, the output torque of the motor MG2 is defined as division of the difference between the torque demand Tr* and a direct transmission torque Ter from the engine 22 by the reduction gear ratio Gr of the transmission 60. In the operation stop state of the engine 22, the output torque of the motor MG2 is defined as division of the torque demand Tr* by the reduction gear ratio Gr of the transmission 60. Namely the output torque of the motor MG2 in the operation state of the engine 22 is smaller than the output torque of the motor MG2 in the operation stop state of the engine 22 by the direct transmission torque Ter from the engine 22. Because of this reason, in the operation state of the engine 22, the drive control routine executes the change speed process of changing over the gear position of the transmission 60 while keeping the engine 22 in operation. In the operation stop state of the engine 22, the drive control routine starts the engine 22 and then executes the change speed process of changing over the gear position of the transmission 60. Such drive control effectively reduces the potential shock in the gear change of the transmission 60. On completion of the change speed process, the gear position of the transmission 60 is changed over to the Hi gear position and the gearshift request of the transmission 60 is cancelled.

When the identified gear position of the transmission 60 is the Hi gear position (step S120), the CPU 72 determines whether a gearshift request of the transmission 60 is output (step S300). When no gearshift request of the transmission 60 is output in the Hi gear position (step S300), the CPU 72 sets the target rotation speed Ne* and the target torque Te* of the engine 22 to drive the engine 22 under load at an efficient drive point corresponding to the engine power demand Pe* (step S330) and sets the torque commands Tm1* and Tm2* of the motors MG1 and MG2 (steps S180 to S210). The CPU 72 sends the target rotation speed Ne* and the target torque Te* of the engine 22 to the engine ECU 24 and the torque commands Tm1* and Tm2* of the motors MG1 and MG2 to the motor ECU 40 (step S220), and exits from this drive control routine. In the Hi gear position of the transmission 60, the drive control keeps the engine 22 in load operation, regardless of the magnitude of the engine power demand Pe*. This drive control is ascribed to the following reason. The reduction gear ratio Gr of the transmission 60 in the Hi gear position is smaller than the reduction gear ratio Gr in the Lo gear position. The maximum torque limit (Tm2*·Gr) applied to the ring gear shaft 32a in the Hi gear position is accordingly lower than the maximum torque limit in the Lo gear position. When a relatively large driving force is required to be output to the ring gear shaft 32a or the drive shaft in the Hi gear position of the transmission 60, the operation of the motor MG2 may not be sufficient to output the required driving force to the ring gear shaft 32a. In the operation stop state of the engine 22, the drive control routine starts the engine 22 and then controls the engine 22 and the motor MG2 to output the required driving force to the ring gear shaft 32a. This may cause a poor response to the driver's demand. Even when a relatively large driving force is required to be output to the ring gear shaft 32a or the drive shaft, the continuous load operation of the engine 22 in the Hi gear position of the transmission 60 enables the required driving force to be quickly output to the ring gear shaft 32a. This is why the engine 22 is kept in load operation in the Hi gear position of the transmission 60.

In response to output of a gearshift request of the transmission 60 at step S300, that is, in response to output of a command for changing over the gear position of the transmission 60 from the Hi gear position to the Lo gear position, when a change speed process of changing over the gear position of the transmission 60 has not yet started (step S310), the CPU 72 gives a start command of the change speed process (step S320) and executes the processing of and after step S330. The change speed process drives and controls a hydraulic actuator (not shown) to change over the gear position of the transmission 60 from the combination of the engaged brake B1 and the released brake B2 to the combination of the released brake B1 and the engaged brake B2. In the Hi gear position of the transmission 60, the gearshift request of the transmission 60 is output in the continuous operation of the engine 22. The drive control routine thus starts the change speed process to change over the gear position of the transmission 60, while keeping the engine 22 in operation. The reason of such drive control is described previously.

In the hybrid vehicle 20 of the embodiment described above, in the Lo gear position of the transmission 60, the engine 22 is driven and controlled to be operated intermittently corresponding to the engine power demand Pe* and ensure output of the required driving force to the ring gear shaft 32a or the drive shaft. In the Hi gear position of the transmission 60, the engine 22 is driven and controlled to continue the load operation and ensure output of the required driving force to the ring gear shaft 32a or the drive shaft. When a relatively large driving force is required in the Hi gear position of the transmission 60, the drive control of the embodiment enables quicker output of the required driving force to the drive shaft, compared with the output of the driving force from the operation stop state of the engine 22. The intermittent operation of the engine 22 in the Lo gear position of the transmission 60 desirably improves the energy efficiency.

In the hybrid vehicle 20 of the embodiment described above, in response to output of a gearshift request of the transmission 60 in the operation state of the engine 22, the drive control performs the change speed process of changing over the gear position of the transmission 60 while keeping the engine 22 in operation. In response to output of a gearshift request of the transmission 60 in the operation stop state of the engine 22, on the other hand, the drive control starts the engine 22 and then performs the change speed process of changing over the gear position of the transmission 60. Such drive control desirably decreases the output torque of the motor MG2, compared with the torque output in the operation stop state of the engine 22, and thereby effectively reduces the potential shock in the gear change of the transmission 60.

In the hybrid vehicle 20 of the embodiment, in the Hi gear position of the transmission 60, the drive control routine sets the target rotation speed Ne* and the target torque Te* of the engine 22 to enable the load operation of the engine 22 at the efficient drive point corresponding to the engine power demand Pe* at step S330 in the flowchart of FIG. 3. One modified drive control routine may compare the engine power demand Pe* with a preset reference power level Pref in the Hi gear position of the transmission 60. When the engine power demand Pe* is greater than the preset reference power level Pref, the modified drive control routine sets the target rotation speed Ne* and the target torque Te* of the engine 22, in the same manner as step S170 in the flowchart of FIG. 3. When the engine power demand Pe* is not greater than the preset reference power level Pref, on the other hand, the modified drive control routine sets a value '0' to the target torque Te* of the engine 22 and drives the engine 22 at idle.

Figure 9:
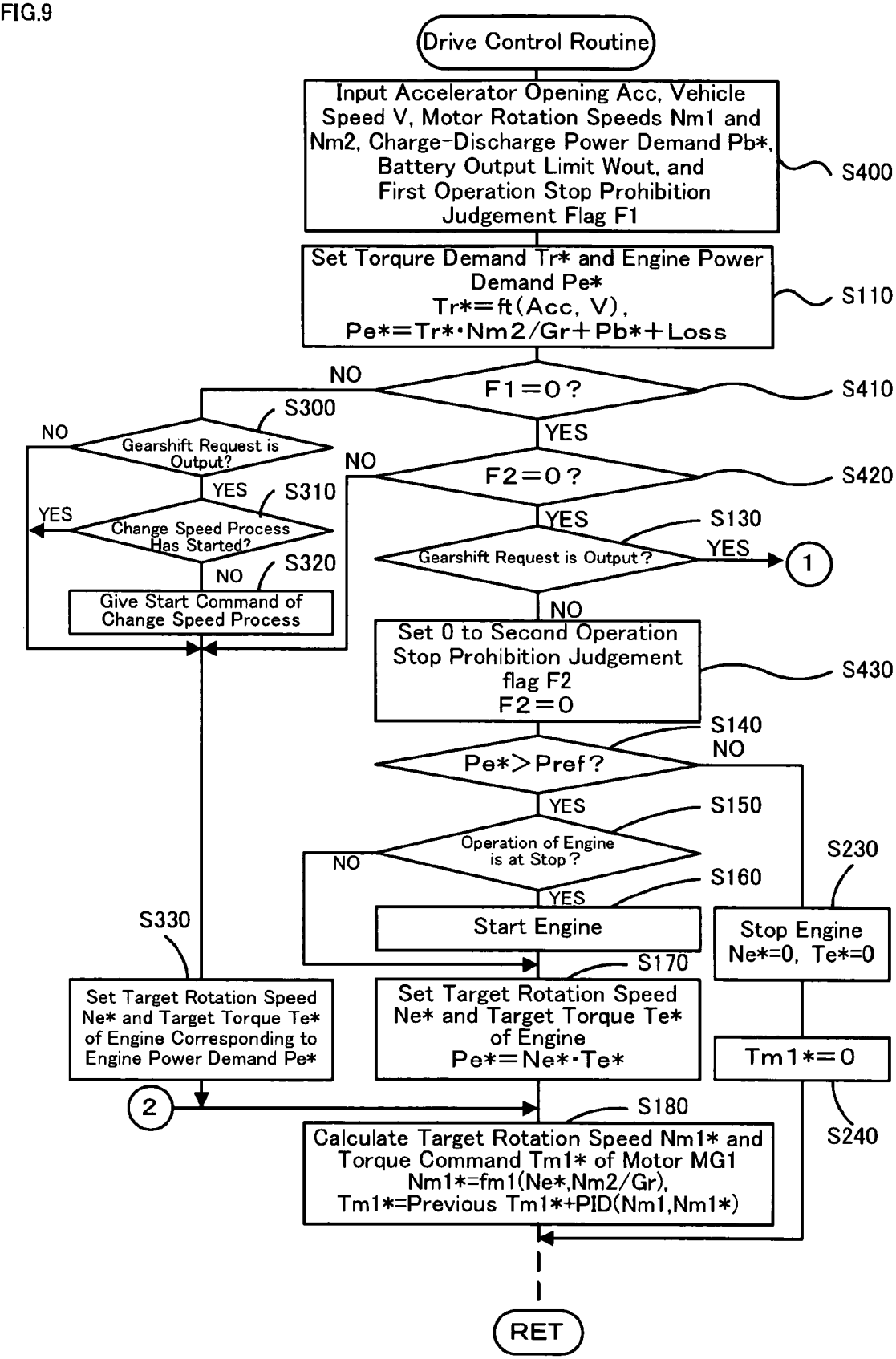
FIG. 9 is a flowchart showing a modified drive control routine.
Figure 10:
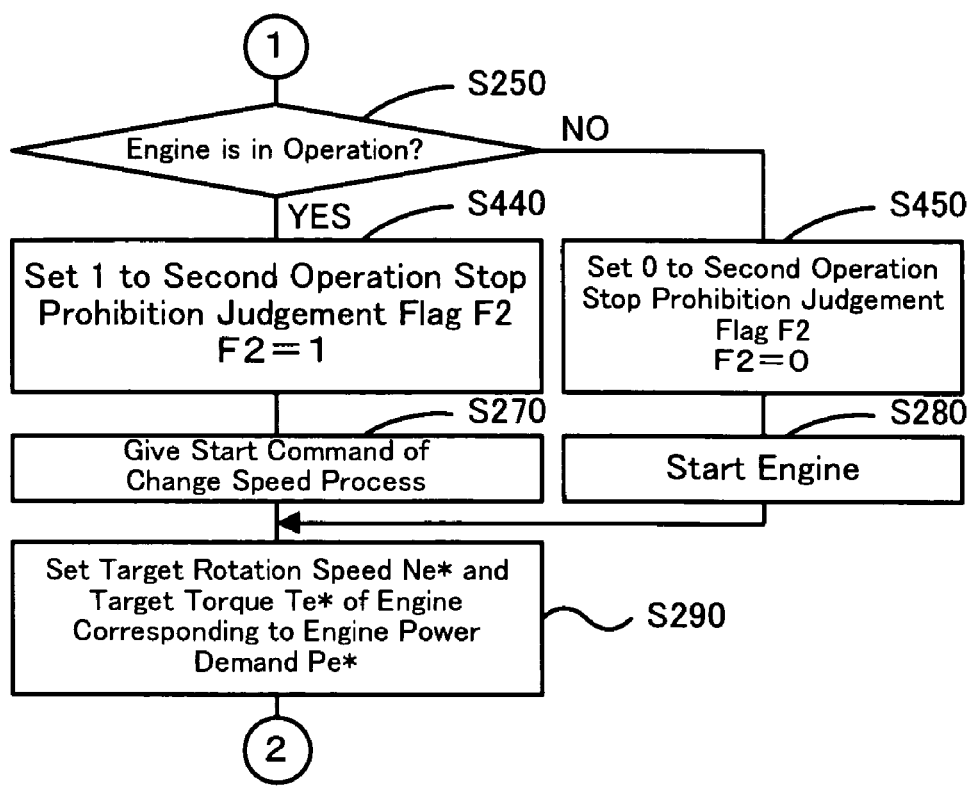
FIG. 10 is a flowchart showing the modified drive control routine.

In the hybrid vehicle 20 of the embodiment, the engine 22 is operated intermittently or is driven continuously according to the gear position of the transmission 60 and the presence or the absence of a gearshift request. One possible modification may prohibit the operation stop of the engine 22 under a preset condition that depends upon the gear position of the transmission 60 and the presence or the absence of a gearshift request, for example, under the condition of the Hi gear position of the transmission 60. A drive control routine of this modification is shown in the flowcharts of FIGS. 9 and 10. This modified drive control routine first inputs various data required for control, that is, the accelerator opening Acc, the vehicle speed V, the rotation speeds Nm1 and Nm2 of the motors MG1 and MG2, and the output limit Wout and the charge-discharge power demand Pb* of the battery 50 like the input at step S100 in the drive control routine of FIGS. 3 and 4, as well as a first operation stop prohibition judgment flag F1 instead of the gear position of the transmission 60 (step S400). The first operation stop prohibition judgment flag F1 is used to determine whether the operation stop of the engine 22 is prohibited. The first operation stop prohibition judgment flag F1 is set equal to 0 in the Lo gear position of the transmission 60, whereas being set equal to 1 in the Hi gear position of the transmission 60. The modified drive control routine subsequently sets the torque demand Tr* and the engine power demand Pe* (step S110) and determines whether the first operation stop prohibition judgment flag F1 is equal to 0 (step S410). When the first operation stop prohibition judgment flag F1 is equal to 1, that is, in the Hi gear position of the transmission 60, it is determined that the operation stop of the engine 22 is prohibited. The modified drive control routine then executes the processing of and after step S300 like the drive control routine of FIGS. 3 and 4. When the first operation stop prohibition judgment flag F1 is equal to 0, that is, in the Lo gear position of the transmission 60, on the other hand, the modified drive control routine determines whether a second operation stop prohibition judgment flag F2 is equal to 0 (step S420). The second operation stop prohibition judgment flag F2 is set in a previous cycle of this modified drive control routine and is used to determine whether the operation stop of the engine 22 is prohibited like the first operation stop prohibition judgment flag F1. When the second operation stop prohibition judgment flag F2 is equal to 0, the modified drive control routine determines whether a gearshift request of the transmission 60 is output (step S130). When no gearshift request of the transmission 60 is output in the Lo gear position of the transmission 60 (step S130), it is determined that the operation stop of the engine 22 is not prohibited. The modified drive control routine accordingly sets the value '0' to the second operation stop prohibition judgment flag F2 (step S430) and executes the processing of and after step S140. When a gearshift request of the transmission 60 is output in the Lo gear position of the transmission 60 (step S130), on the other hand, the modified drive control routine determines whether the engine 22 is in operation (step S250). In the operation state of the engine 22, the modified drive control routine sets the value '1' to the second operation stop prohibition judgment flag F2 (step S440) and executes the processing of and after step S270. In the operation stop state of the engine 22, the modified drive control routine sets the value '0' to the second operation stop prohibition judgment flag F2 (step S450) and starts the engine 22 (step S280). On the start of the engine 22, the modified drive control routine sets the value '1' to the second operation stop prohibition judgment flag F2 (step S440) and executes the processing of and after step S270. Setting the value '1' to the second operation stop prohibition judgment flag F2 gives a negative answer at step S420 in a next cycle of the drive control routine and prohibits the operation stop of the engine 22. On completion of the change speed process, the gear position of the transmission 60 is changed over to the Hi gear position, which sets the value '1' to the first operation stop prohibition judgment flag F1. This setting gives a negative answer at step S410 and prohibits the operation stop of the engine 22.

In the hybrid vehicle 20 of the embodiment, the transmission 60 has the two different speeds, that is, the Hi gear position and the Lo gear position. The transmission may have three or more different speeds or may be constructed as a continuously variable transmission. In any of these transmissions, when the reduction gear ratio is not greater than a preset reference level, which is less than a maximum possible reduction gear ratio, the engine 22 is driven continuously. In the operation state of the engine 22, in response to a change speed request of the transmission from a speed having the reduction gear ratio of greater than the preset reference level to a different speed having the reduction gear ratio of not greater than the preset reference level, the drive control changes the reduction gear ratio of the transmission while keeping the engine 22 in operation. In the operation stop state of the engine 22, the drive control starts the engine 22 and then changes the reduction gear ratio of the transmission.

Figure 11:
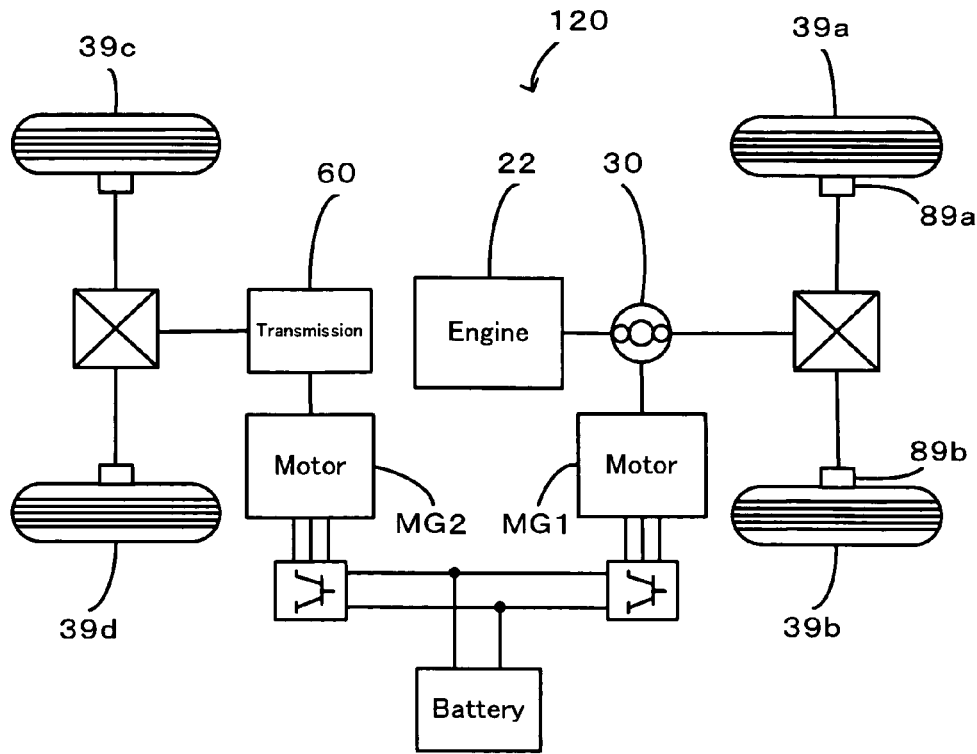
FIG. 11 schematically illustrates the configuration of another hybrid vehicle in one modified example.

In the hybrid vehicle 20 of the embodiment described above, the power of the motor MG2 is converted by the gear change in the transmission 60 and is output to the ring gear shaft 32a or the drive shaft. The technique of the invention is, however, not restricted to this configuration but may be adopted in a hybrid vehicle 120 of a modified configuration shown in FIG. 11, where the power of the motor MG2 is converted by the gear change in the transmission 60 and is transmitted to a different axle (an axle linked to wheels 39c and 39d) from the axle connecting with the ring gear shaft 32a (the axle linked to the drive wheels 39a and 39b).

Figure 12:
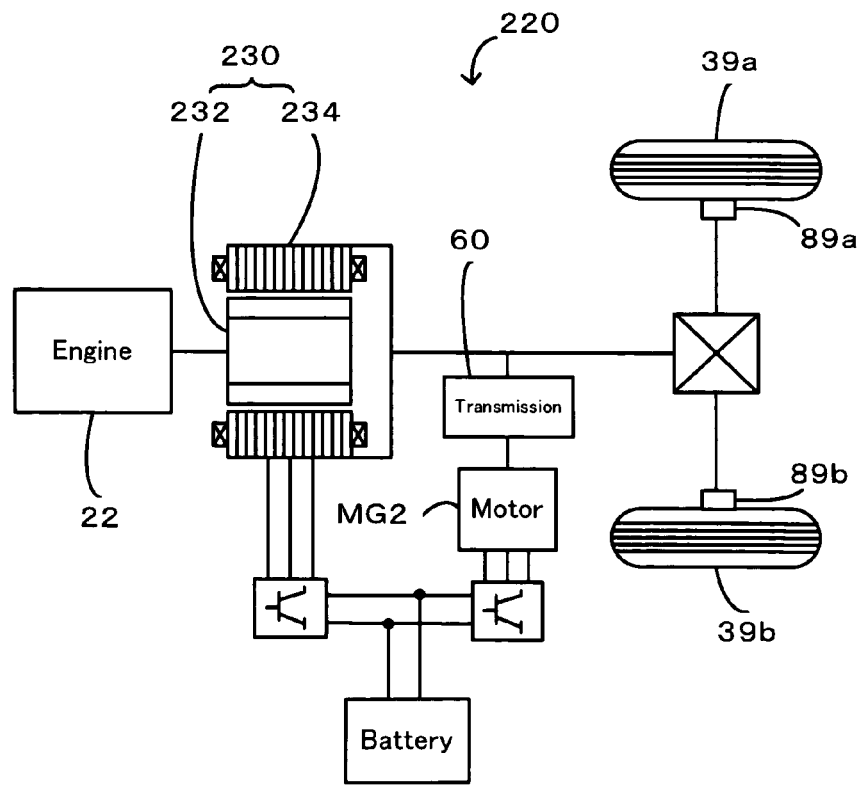
FIG. 12 schematically illustrates the configuration of still another hybrid vehicle in another modified example.

In the hybrid vehicle 20 of the embodiment, the power of the engine 22 is output via the power distribution integration mechanism 30 to the ring gear shaft 32a or the drive shaft linked to the drive wheels 39a and 39b. The technique of the invention is applicable to a hybrid vehicle 220 of another modified example as shown in FIG. 12. The hybrid vehicle 220 of this modified configuration includes a pair-rotor motor 230 that includes an inner rotor 232 linked to the crankshaft 26 of the engine 22 and an outer rotor 234 connected to the drive shaft to output power to the drive wheels 39a and 39b. The pair-rotor motor 230 transmits part of the output power of the engine 22 to the drive shaft, while converting residual part of the output power into electric power.

Figure 13:
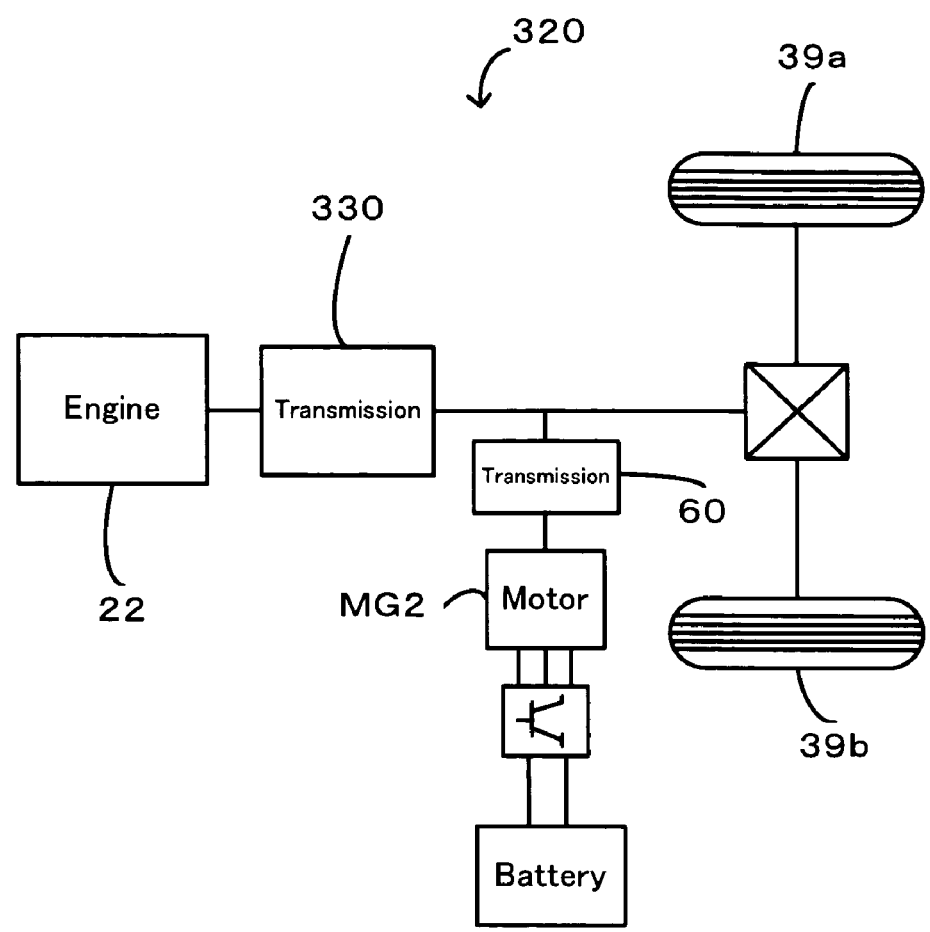
FIG. 13 schematically illustrates the configuration of another hybrid vehicle in still another modified example.

In the hybrid vehicle 20 of the embodiment, the power of the engine 22 is output via the power distribution integration mechanism 30 to the ring gear shaft 32a or the drive shaft. The technique of the invention is also applicable to a hybrid vehicle 320 of still another modified example shown in FIG. 13, where the power of the engine 22 is output to the drive shaft via another transmission 330.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The disclosure of Japanese Patent Application No. 2004-358016 filed Dec. 10, 2004 including specification, drawings and claims is incorporated herein by reference in its entirety.

What is claimed is:

1. A power output apparatus that outputs power to a drive shaft, said power output apparatus comprising:
an internal combustion engine that outputs power to the drive shaft;
a motor that inputs and outputs power;
a transmission mechanism that converts the output power of the motor at a selected gear ratio and transmits the converted power to the drive shaft;
an accumulator unit that transmits electric power to and from the motor;
a required driving force setting module that sets a required driving force to be output to the drive shaft;
an operation stop prohibition module that prohibits operation stop of the internal combustion engine when the selected gear ratio in the transmission mechanism is a reduction gear ratio for reduction of a rotation speed of a rotating shaft of the motor and transmission of the converted power with the reduced rotation speed to the drive shaft and is not greater than a preset reference level, which is less than a maximum possible reduction gear ratio of the transmission mechanism; and a driving force control module that, in the case of prohibition of the operation stop of the internal combustion engine by said operation stop prohibition module, controls the internal combustion engine, the motor, and the transmission mechanism to keep the internal combustion engine in load operation and to output a driving force equivalent to the required driving force to the drive shaft, in the case of no prohibition of the operation stop of the internal combustion engine by said operation stop prohibition module, said driving force control module controlling the internal combustion engine, the motor, and the transmission mechanism to cause intermittent operation of the internal combustion engine and to output the driving force equivalent to the required driving force to the drive shaft.

2. A power output apparatus in accordance with claim 1, wherein when the selected gear ratio in the transmission mechanism is to be changed over from a reduction gear ratio of greater than the preset reference level to another reduction gear ratio of not greater than the preset reference level in an operation state of the internal combustion engine by said driving force control module, said operation stop prohibition module prohibits the operation stop of the internal combustion engine prior to the changeover of the selected gear ratio in the transmission mechanism.

3. A power output apparatus in accordance with claim 1, wherein when the selected gear ratio in the transmission mechanism is to be changed over from a reduction gear ratio of greater than the preset reference level to another reduction gear ratio of not greater than the preset reference level in an operation stop state of the internal combustion engine, said driving force control module starts the internal combustion engine prior to the changeover of the selected gear ratio in the transmission mechanism.

4. A power output apparatus in accordance with claim 1, said power output apparatus further comprising:

an electric power-mechanical power input output mechanism that is connected to an output shaft of the internal combustion engine and to the drive shaft and outputs at least part of the output power of the internal combustion engine to the drive shaft through input and output of electric power and mechanical power, wherein said driving force control module controls the internal combustion engine, the electric power-mechanical power input output mechanism, the motor, and the transmission mechanism to output the driving force equivalent to the required driving force to the drive shaft.

5. A power output apparatus in accordance with claim 4, wherein the electric power-mechanical power input output mechanism comprises:

a three shaft power input output module that is linked to three shafts, the output shaft of the internal combustion engine, the drive shaft, and the rotating shaft, and automatically inputs and outputs power from and to a residual one shaft based on powers input from and output to any two shafts among the three shafts; and a generator that is capable of inputting and outputting power from and to the rotating shaft.

6. A power output apparatus in accordance with claim 4, wherein the electric power-mechanical power input output mechanism comprises:

a pair-rotor motor that has a first rotor connected to the output shaft of the internal combustion engine and a second rotor connected to the drive shaft, where the first rotator rotates relative to the second rotor.

7. A power output apparatus that outputs power to a drive shaft, said power output apparatus comprising:

an internal combustion engine that outputs power to the drive shaft;

a motor that inputs and outputs power;

a transmission mechanism that converts the output power of the motor at a selected gear ratio and transmits the converted power to the drive shaft;

an accumulator unit that transmits electric power to and from the motor;

a required driving force setting module that sets a required driving force to be output to the drive shaft; and a control module that controls the internal combustion engine, the motor, and the transmission mechanism to cause intermittent operation of the internal combustion engine and to output a driving force equivalent to the required driving force to the drive shaft, when the selected gear ratio in the transmission mechanism is a reduction gear ratio for reduction of a rotation speed of a rotating shaft of the motor and transmission of the converted power with the reduced rotation speed to the drive shaft and is greater than a preset reference level, which is less than a maximum possible reduction gear ratio of the transmission mechanism, when the selected gear ratio in the transmission mechanism is not greater than the preset reference level, said control module controlling the internal combustion engine, the motor, and the transmission mechanism to keep the internal combustion engine in load operation and to output the driving force equivalent to the required driving force to the drive shaft.

8. A power output apparatus in accordance with claim 7, wherein when the selected gear ratio in the transmission mechanism is to be changed over from a reduction gear ratio of greater than the preset reference level to another reduction gear ratio of not greater than the preset reference level in an operation state of the internal combustion engine, said control module controls the internal combustion engine, the motor, and the transmission mechanism to change over the selected gear ratio in the transmission mechanism while keeping the internal combustion engine in operation.

9. A power output apparatus in accordance with claim 7, wherein when the selected gear ratio in the transmission mechanism is to be changed over from a reduction gear ratio of greater than the preset reference level to another reduction gear ratio of not greater than the preset reference level in an operation stop state of the internal combustion engine, said control module controls the internal combustion engine, the motor, and the transmission mechanism to start the internal combustion engine prior to the changeover of the selected gear ratio in the transmission mechanism.

10. A power output apparatus in accordance with claim 7, said power output apparatus further comprising:

an electric power-mechanical power input output mechanism that is connected to an output shaft of the internal combustion engine and to the drive shaft and outputs at least part of the output power of the internal combustion engine to the drive shaft through input and output of electric power and mechanical power, wherein said control module controls the internal combustion engine, the electric power-mechanical power input output mechanism, the motor, and the transmission mechanism to output the driving force equivalent to the required driving force to the drive shaft.

11. A power output apparatus in accordance with claim 7, wherein the electric power-mechanical power input output mechanism comprises:
a three shaft power input output module that is linked to three shafts, the output shaft of the internal combustion engine, the drive shaft, and the rotating shaft, and automatically inputs and outputs power from and to a residual one shaft based on powers input from and output to any two shafts among the three shafts; and
a generator that is capable of inputting and outputting power from and to the rotating shaft.

12. A power output apparatus in accordance with claim 7, wherein the electric power-mechanical power input output mechanism comprises:
a pair-rotor motor that has a first rotor connected to the output shaft of the internal combustion engine and a second rotor connected to the drive shaft, where the first rotator rotates relative to the second rotor.

13. A control system for a power output apparatus, said power output apparatus comprising: an internal combustion engine that outputs power to a drive shaft; a motor that inputs and outputs power; a transmission mechanism that converts the output power of the motor at a selected gear ratio and transmits the converted power to the drive shaft; and an accumulator unit that transmits electric power to and from the motor,
said control system comprising:
a required driving force setting module that sets a required driving force to be output to the drive shaft;
an operation stop prohibition module that prohibits operation stop of the internal combustion engine when the selected gear ratio in the transmission mechanism is a reduction gear ratio for reduction of a rotation speed of a rotating shaft of the motor and transmission of the converted power with the reduced rotation speed to the drive shaft and is not greater than a preset reference level, which is less than a maximum possible reduction gear ratio of the transmission mechanism; and
a driving force control module that, in the case of prohibition of the operation stop of the internal combustion engine by said operation stop prohibition module, controls the internal combustion engine, the motor, and the transmission mechanism to keep the internal combustion engine in load operation and to output a driving force equivalent to the required driving force to the drive shaft,
in the case of no prohibition of the operation stop of the internal combustion engine by said operation stop prohibition module, said driving force control module controlling the internal combustion engine, the motor, and the transmission mechanism to cause intermittent operation of the internal combustion engine and to output the driving force equivalent to the required driving force to the drive shaft.

14. A control system in accordance with claim 13, wherein when the selected gear ratio in the transmission mechanism is to be changed over from a reduction gear ratio of greater than the preset reference level to another reduction gear ratio of not greater than the preset reference level in an operation state of the internal combustion engine by said driving force control module, said operation stop prohibition module prohibits the operation stop of the internal combustion engine prior to the changeover of the selected gear ratio in the transmission mechanism.

15. A control system in accordance with claim 13, wherein when the selected gear ratio in the transmission mechanism is to be changed over from a reduction gear ratio of greater than the preset reference level to another reduction gear ratio of not greater than the preset reference level in an operation stop state of the internal combustion engine, said driving force control module starts the internal combustion engine prior to the changeover of the selected gear ratio in the transmission mechanism.

16. A control system for a power output apparatus, said power output apparatus comprising: an internal combustion engine that outputs power to a drive shaft; a motor that inputs and outputs power; a transmission mechanism that converts the output power of the motor at a selected gear ratio and transmits the converted power to the drive shaft; and an accumulator unit that transmits electric power to and from the motor,
said control system comprising:
a required driving force setting module that sets a required driving force to be output to the drive shaft; and
a control module that controls the internal combustion engine, the motor, and the transmission mechanism to cause intermittent operation of the internal combustion engine and to output a driving force equivalent to the required driving force to the drive shaft, when the selected gear ratio in the transmission mechanism is a reduction gear ratio for reduction of a rotation speed of a rotating shaft of the motor and transmission of the converted power with the reduced rotation speed to the drive shaft and is greater than a preset reference level, which is less than a maximum possible reduction gear ratio of the transmission mechanism,
when the selected gear ratio in the transmission mechanism is not greater than the preset reference level, said control module controlling the internal combustion engine, the motor, and the transmission mechanism to keep the internal combustion engine in load operation and to output the driving force equivalent to the required driving force to the drive shaft.

17. A control system in accordance with claim 16, wherein when the selected gear ratio in the transmission mechanism is to be changed over from a reduction gear ratio of greater than the preset reference level to another reduction gear ratio of not greater than the preset reference level in an operation state of the internal combustion engine, said control module controls the internal combustion engine, the motor, and the transmission mechanism to change over the selected gear ratio in the transmission mechanism while keeping the internal combustion engine in operation.

18. A control system in accordance with claim 16, wherein when the selected gear ratio in the transmission mechanism is to be changed over from a reduction gear ratio of greater than the preset reference level to another reduction gear ratio of not greater than the preset reference level in an operation stop state of the internal combustion engine, said control module controls the internal combustion engine, the motor, and the transmission mechanism to start the internal combustion engine prior to the changeover of the selected gear ratio in the transmission mechanism.

19. A control method of a power output apparatus, said power output apparatus comprising: an internal combustion engine that outputs power to a drive shaft; a motor that inputs and outputs power; a transmission mechanism that converts the output power of the motor at a selected gear ratio and transmits the converted power to the drive shaft; and an accumulator unit that transmits electric power to and from the motor,
said control method controlling the internal combustion engine, the motor, and the transmission mechanism to cause intermittent operation of the internal combustion engine and to output to the drive shaft a driving force equivalent to a required driving force, which is to be output to the drive shaft, when the selected gear ratio in the transmission mechanism is a reduction gear ratio for reduction of a rotation speed of a rotating shaft of the motor and transmission of the converted power with the reduced rotation speed to the drive shaft and is greater than a preset reference level, which is less than a maximum possible reduction gear ratio of the transmission mechanism, when the selected gear ratio in the transmission mechanism is not greater than the preset reference level, said control method controlling the internal combustion engine, the motor, and the transmission mechanism to keep the internal combustion engine in load operation and to output the driving force equivalent to the required driving force to the drive shaft.

20. A control method in accordance with claim 19, when the selected gear ratio in the transmission mechanism is to be changed over from a reduction gear ratio of greater than the preset reference level to another reduction gear ratio of not greater than the preset reference level in an operation state of the internal combustion engine, said control method controls the internal combustion engine, the motor, and the transmission mechanism to change over the selected gear ratio in the transmission mechanism while keeping the internal combustion engine in operation.

21. A control method in accordance with claim 19, when the selected gear ratio in the transmission mechanism is to be changed over from a reduction gear ratio of greater than the preset reference level to another reduction gear ratio of not greater than the preset reference level in an operation stop state of the internal combustion engine, said control method controls the internal combustion engine, the motor, and the transmission mechanism to start the internal combustion engine prior to the changeover of the selected gear ratio in the transmission mechanism.

* * * * *